July 8, 1941. B. P. FONDA 2,248,225
DEHUMIDIFIER
Filed Aug. 27, 1937 6 Sheets-Sheet 1

Fig. 1

INVENTOR.
BAYARD P. FONDA
BY
ATTORNEYS.

July 8, 1941.  B. P. FONDA  2,248,225
DEHUMIDIFIER
Filed Aug. 27, 1937   6 Sheets-Sheet 2

INVENTOR.
BAYARD P. FONDA
BY
*Kwis, Hudson & Kent*
ATTORNEYS

July 8, 1941.　　　　B. P. FONDA　　　　2,248,225
DEHUMIDIFIER
Filed Aug. 27, 1937　　　　6 Sheets-Sheet 4

INVENTOR.
BAYARD P. FONDA
BY Kwis, Hudson & Kent
ATTORNEYS

July 8, 1941.  B. P. FONDA  2,248,225
DEHUMIDIFIER
Filed Aug. 27, 1937  6 Sheets-Sheet 5

INVENTOR.
BAYARD P. FONDA
BY
Kwis, Hudson & Kent
ATTORNEYS.

July 8, 1941.   B. P. FONDA   2,248,225
DEHUMIDIFIER
Filed Aug. 27, 1937   6 Sheets-Sheet 6

INVENTOR.
BAYARD P. FONDA
BY
ATTORNEYS

Patented July 8, 1941

2,248,225

UNITED STATES PATENT OFFICE 2,248,225

DEHUMIDIFIER

Bayard P. Fonda, Cleveland Heights, Ohio, assignor to The Bryant Heater Company, Cleveland, Ohio, a corporation of Ohio Application August 27, 1937, Serial No. 161,295

9 Claims. (Cl. 183—4)

This invention relates to a dehumidifier for dehumidifying air by means of an adsorbent material.

The principal object of the present invention is to provide a dehumidifier which embodies to a high degree the features of simplicity, compactness, and efficiency.

A further object is to arrange the layers or beds of adsorption material in a manner such that a relatively large volume of air is permitted to pass through the material with a minimum of required floor space.

A still further object is to make provision in the dehumidifying machine for separate beds or layers of adsorbent material, for activating certain portions of the adsorbent material while other portions are being used to dehumidify air, and to provide means embodying a minimum number of dampers or valves and, in general, a very simplified mechanism for providing for the continuous and simultaneous dehumidifying and activation and for changing at desired intervals the flow of the wet air to be dehumidified and the hot activating air from one part of the adsorbent material to the other.

A further object is to conserve space and reduce the size of the dehumidifying mechanism by placing the heater or burner inside the activation or heating inlet chamber, thus doing away with a separate furnace or jacket to contain the burner and from which the heated air would be conducted to the activation inlet chamber.

A still further object is to arrange the adsorption fan and the activation fan, i. e., the fans or blowers which circulate the air to be dehumidified and the air for activation purposes, in a manner such that a single motor may be utilized for rotating both fans, thus doing away with the necessity of two motors or equivalent rotating mechanism, such as supplementary bearings, belt drives, etc.

A still further object of the invention is to provide a novel timing mechanism and cycle control in connection with the valve actuating mechanism by which the cycles of the activation heating period and the adsorption period are automatically controlled.

Further objects will appear from the following detailed description of the invention which may be here briefly summarized as consisting in certain novel combinations and arrangements of parts and details of construction which will be described in the specification and set forth in the appended claims.

Referring now to the drawings.

Figure 1:
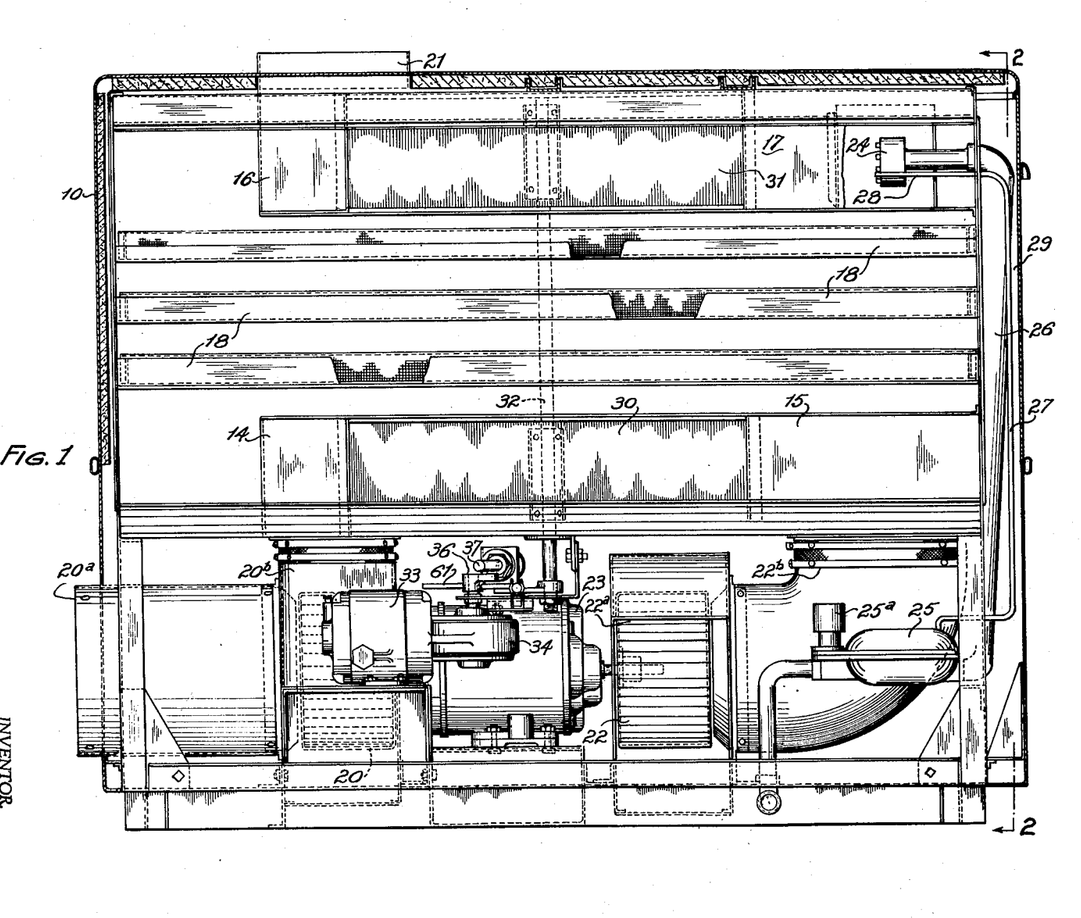
Fig. 1 is a side view of my improved dehumidifier with the front wall of the housing removed and the housing walls in section.
Figures 5, 6:
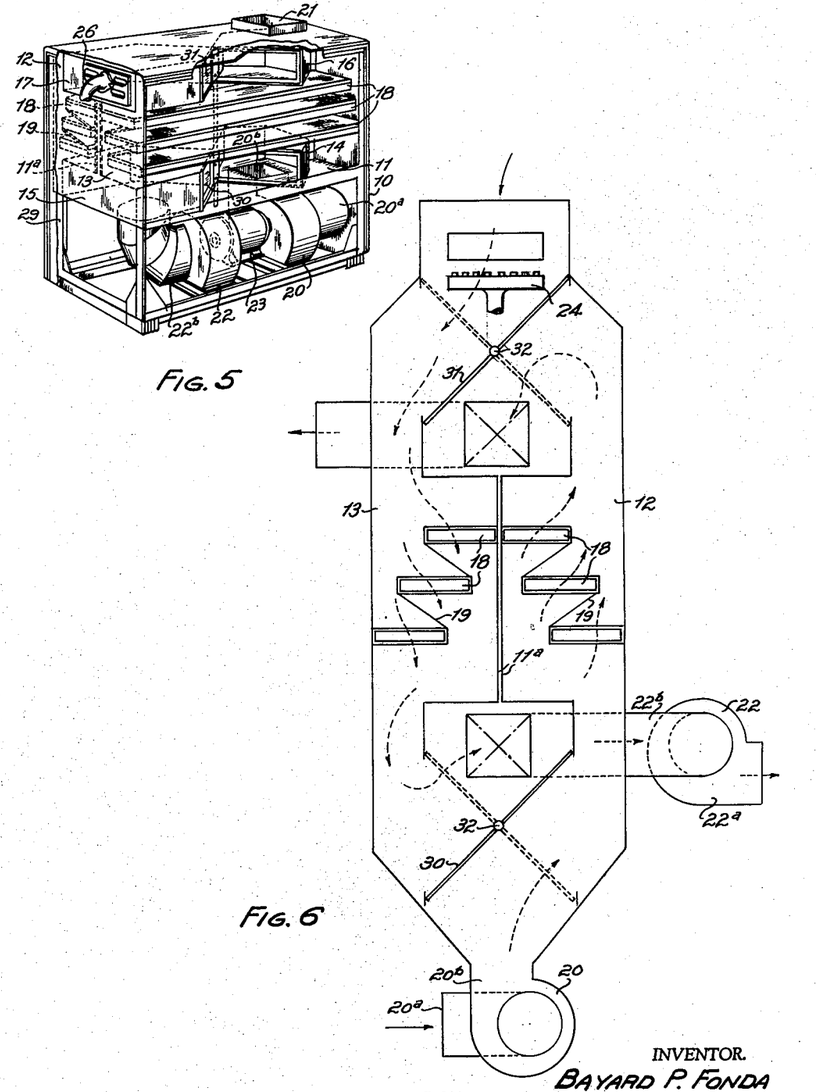
Fig. 5 is a perspective view with the front, end and top housing walls removed, showing the major portion of the interior mechanism of the dehumidifier.
Fig. 6 is a diagrammatic view illustrating the operation of the dehumidifier, but in this view no attempt has been made to show the true relative positions of the parts.
Figure 7:
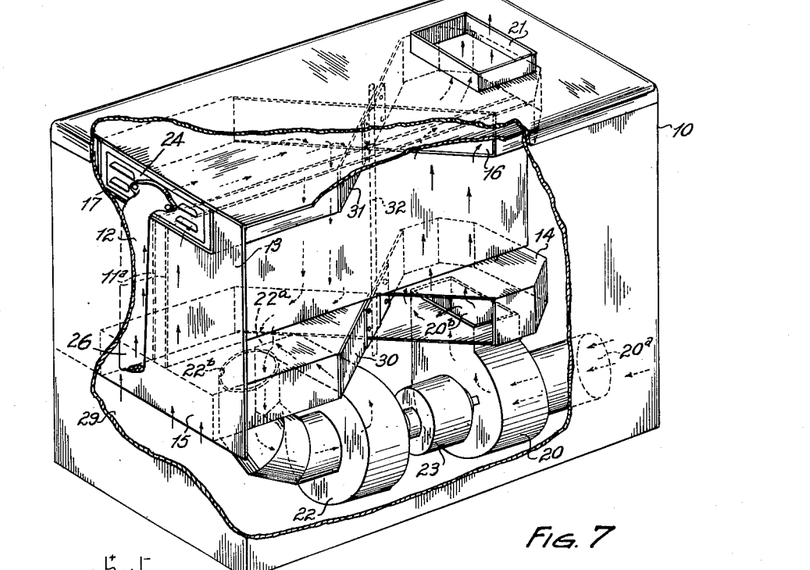
Fig. 7 is another diagrammatic view with the walls of the housing broken away and with parts in the interior of the housing shown in perspective and in substantially their true relative positions.

The dehumidifier, in its preferred form, includes an outer housing 10 preferably oblong in shape and formed of sheet metal, and at least the upper part being preferably lined with insulating material. The housing is composed largely of panels which can be separately applied and removed for assembly purposes and to afford access to the interior for repairs, replacement, and the like. In the lower part of the housing there is provided a suitable framework on which are supported the fans, the motor for actuating them, the damper operating mechanism, and other equipment, as best shown in Figs. 1 and 5. Above this framework and the operating mechanism supported by it there is a horizontal partition 11 (Fig. 5) and above this is an inner sheet metal housing or casing composed of side and end walls, a top, and a bottom which is formed by the partition 11. The side walls are readily removable from the remainder of the inner housing so that access may be had to the trays of adsorbent material hereinafter referred to. In this inner housing or casing are two compartments 12 and 13 separated by a vertical partition extending from one end of the housing to the other, and, in this instance, composed of two vertically spaced plates 11a in order to accommodate between them the damper operating shaft. This sheet metal unit includes also four chambers which are symmetrically arranged with respect to the damper operating shaft with two above the compartments 12 and 13 and two beneath them (see particularly Figs. 5 and 7). The two lower chambers include an inlet chamber 14 for wet air to be dehumidified and an outlet chamber 15 for the activating air. The two upper chambers consist of an outlet chamber 16 for the dehumidified air and the activating air inlet chamber 17. In the two compartments 12 and 13 is located adsorbent material preferably arranged in superposed trays 18 having foraminous top and bottom walls so that air may pass readily therethrough. Any suitable adsorbent material, such as silica gel which material has proved very effective, may be employed. The trays can be slid into the compartments 12 and 13 when the side panels of the housing are removed, and they may be supported in superposed spaced relation in any desired manner, as by shelves or shoulders provided on any of the interior walls of the compartments. There may be any number of trays 18 in the two compartments 12 and 13, preferably the same number in each compartment, the actual number depending upon the size or capacity of the dehumidifier.

Figure 2:
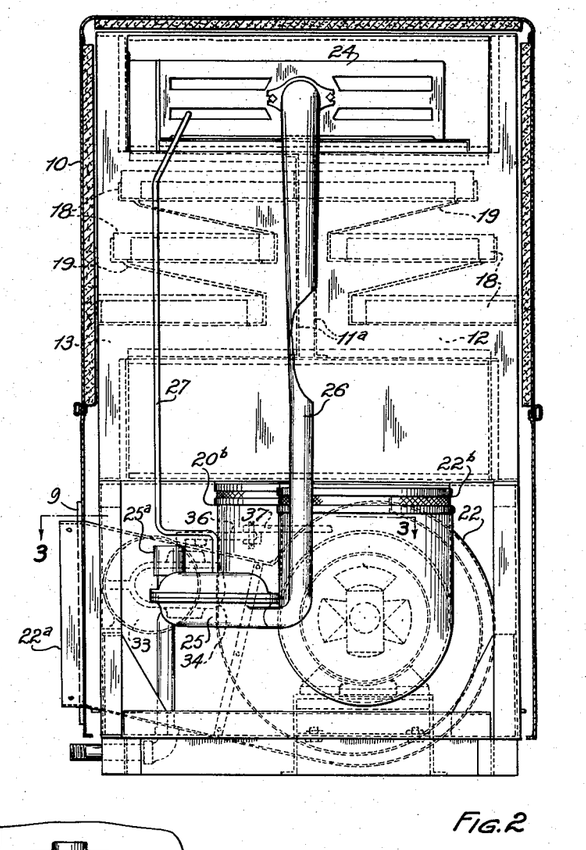
Fig. 2 is an end view looking toward the left of Fig. 1 with the end of the housing removed and the housing walls in section substantially along the line 2—2 of Fig. 1.

For a purpose to be explained, the trays in each compartment are staggered, as shown in Figs. 2 and 5. The uppermost tray in each compartment extends inwardly to the vertical partition 11a with a space between its outer edge and the adjacent side wall of the compartment, and the trays beneath are located progressively and successively nearer the side wall and progressively different distances from the partition 11a. Baffles 19 extending the full length of the trays separate each tray from the one immediately above it, these baffles being in inclined position and extending from the upper inner edge of one tray to the lower surface of the adjoining tray near its outer edge (Figs. 2 and 5). It might be stated at this point that in my improved dehumidifier the air to be dehumidified passes upwardly through the adsorbent material in the trays in one compartment or the other, and at the same time activating air is passed downwardly through the adsorbent material in the trays in the other compartment, and at given intervals the upward flow of wet air to be dehumidified and the downward flow of activating air are reversed with respect to the two compartments.

Referring again to the staggered relation of the trays in each compartment and to the baffles 19, it will be seen particularly by reference to Figs. 2, 5 and 6, that part of the upwardly flowing air to be dehumidified (regardless of the compartment in which the dehumidifying is for the instant taking place) passes upwardly through the lowermost tray and partly around the lowermost tray, and that above the lowermost tray the air again divides part passing through the second tray and part around the latter and upwardly through the third tray. Likewise, in the other compartment the activating air passes downwardly part passing through the uppermost tray and part around it where the air again divides and part passes downwardly through the second tray and part around the second tray and through the third tray. Of course, the same process occurs regardless of the number of trays employed in each compartment from two to any greater number determined by the limit of practicability or necessity. Thus this novel arrangement of trays and baffles and the directions of air flow allow the wet air and the activating air to pass in parallel paths through layers of adsorbent material, with the net result that a very large area of adsorbent material is possible in a relatively small space. This result is a large contributing factor in the attainment of high capacity with a relatively small dehumidifying machine, which is a highly desirable feature inasmuch as conservation of floor space is always desired and frequently necessary.

Before referring to the dampers which at intervals switch the flow of air to be dried from one compartment to the other and the flow of activating air from the latter compartment to the first named, I will refer briefly to the fans which circulate the wet air and the activating air and their location and manner of operation. Two fans are of course employed for this purpose, and these and their housings are located in the base of the housing 10 and along with the driving motor are mounted on the framework in the lower part thereof. The fan which circulates the wet air to be dehumidified and its housing are shown at 20. This fan which forces wet air under pressure upwardly through the dehumidifier has its inlet at one end of the housing 10, this inlet being indicated at 20a in Figs. 6 and 7. The outlet part of the housing indicated at 20b extends upwardly and is fitted to an opening in the bottom of chamber 14, and the air thus caused to flow upwardly through either compartment 12 or compartment 13 leaves the housing 10 in a dehumidified state by way of an outlet opening 21 provided in the top of the housing (see Figs. 1, 5, and 7).

The activation fan with its housing is shown at 22. It is coaxial with the fan 20 and arranged adjacent thereto so that both fans can be rotated by a single motor 23 which is located between the two fans the latter being fixed to shaft extensions projecting from opposite ends of the motor. This does away with the necessity for two driving motors or equivalent driving instrumentalities in the form of shafting, bearings, belts, etc., and greatly simplifies the drive for the fans. The fan 22 is a suction fan which draws the activating air through the machine at less than atmospheric pressure. This is of importance inasmuch as with the activating air there are mixed the products of combustion from the heater, and should there by chance be any leak in the circulating system, it is impossible for any fumes to be expelled through the leak. The housing of this fan 22 in this instance discharges through the side of the housing, its outlet end being indicated at 22a in Figs. 1 and 7. Its inlet end, indicated at 22b, extends upwardly and is fitted to an opening in the bottom of chamber 15.

Another factor in the attainment of compactness and simplicity is the location of the heater for the activating air directly in chamber 17 rather than outside the dehumidifier as heretofore. This heater, which is shown at 24 (see particularly Fig. 1), is supplied with gas from a suitable valve 25 which is preferably a diaphragm type valve controlled by a solenoid indicated at 25a in Fig. 1. This valve, which is preferably located in the lower part of the housing 10, is connected to the burner 24 in the upper chamber 17 by a burner tube 26 which, together with the pipe 27 for supplying gas to a pilot burner 28 (see Fig. 1), is located in a shallow vertical compartment 29 which as shown in Fig. 1 extends upwardly along one end of the housing 10. The activating air which is circulated by the fan 22 enters the bottom of the compartment 29 from the lower part of the housing 10 to which the air is admitted through a suitable grating 9 which is so located that the air which is sucked into this compartment sweeps over the motor 23 and also the damper operating motor and thus keeps these motors operating at a desirable low temperature and at the same time this air picks up some heat before its temperature is elevated by the heater 24. The upright compartment 29 communicates with the end of heating chamber 17, as indicated in Figs. 1, 2, 6, and 7, and as it flows past the burner its temperature is raised to the point desired for efficient activation of the moist adsorbent material. It then passes down through the adsorbent material in either compartment 12 or compartment 13, depending upon the position of the dampers next to be referred to and is then sucked through the housing of the fan 22 and discharged out through the side of the housing 10.

I will next take up the mechanism by which the shifting of the air streams from one compartment to the other is accomplished. Inasmuch as this dehumidifier is provided with two compartments containing adsorption material, and inasmuch as there are two inlet chambers and two outlet chambers for the wet air to be dehumidified and for the activating air, for the control of the air flow and a shifting of the two air streams back and forth so as to provide a continuous flow of dehumidified air and a continuous or substantially continuous activation at least eight valves or the equivalent thereof are required. I obtain simplicity of design and operation by the novel arrangement of two four-way dampers or valves carried by a single operating shaft for controlling the flow of air through the two compartments and the four chambers connected thereto. For the accomplishment of this purpose, each of the chambers 14, 15, 16, and 17 is provided with two angularly disposed ports. Two similarly arranged ports of the superposed chambers 14 and 16 communicate with compartment 12, one being an inlet port for wet air and the other being an outlet port for dehumidified air. The other two similarly disposed ports of superposed chambers 14 and 16 communicate with compartment 13. Furthermore, two similarly positioned ports of the superposed chambers 15 and 17 constitute respectively an inlet port and an outlet port for the passage of activating air through the compartment 12 and the other two ports of these same chambers communicate with and function similarly for compartment 13. Furthermore, two ports of the two lower chambers 14 and 15 are in alignment with each other or in the same plane, and the same is true of the other two ports of the same chambers. Likewise, the same relationship exists with respect to the four ports of the two upper chambers 16 and 17. This makes it possible to control the eight ports with two four-way dampers 30 and 31, one arranged in the plane of the four upper ports and the other in the plane of the four lower ports, the dampers being mounted on a vertical shaft 32 so that when the shaft is rocked back and forth in a certain arc, depending upon the angularity of the two pairs of ports of each chamber, two aligned ports of the lower chambers 14 and 15 are closed by the lower damper 30 while the other two ports are placed in communication respectively with the lower portions of the two compartments 12 and 13. At the same time, two aligned ports of the upper chambers 16 and 17 are closed by the upper damper 31 while the other two ports of these chambers communicate with the upper portions of the compartments 12 and 13. Obviously, by rocking the shaft 32 and therefore these two four-way dampers, the ports previously closed thereby will be opened and those previously opened will be closed.

Figure 3:
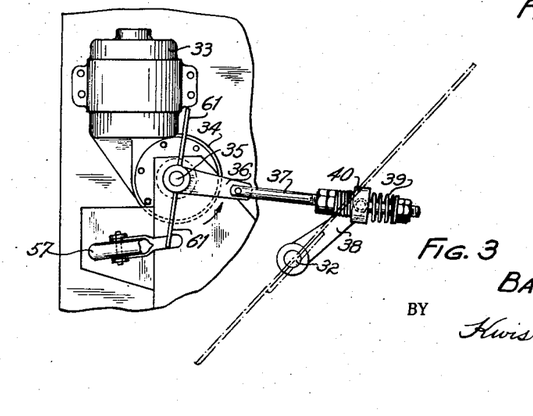
Fig. 3 is a plan view of the major portion of the damper operating mechanism.
Figures 4, 4A:
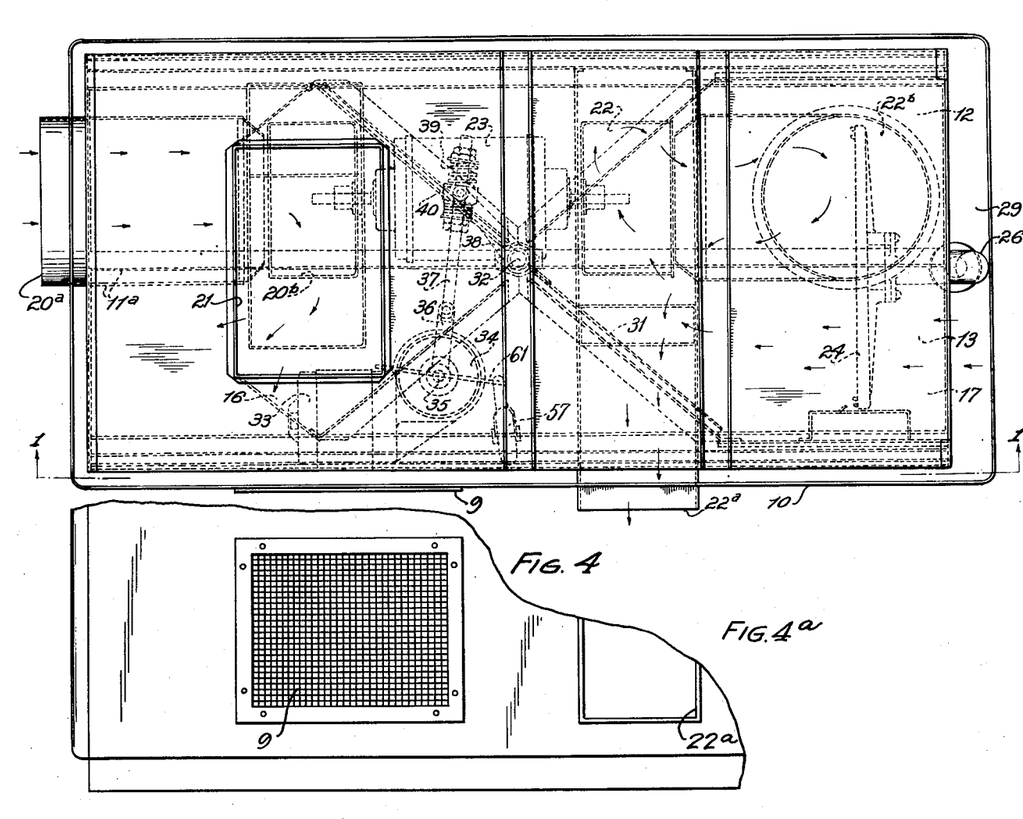
Fig. 4 is a plan view with the cover of the housing removed.
Fig. 4a is a fragmental elevational view showing the intake for activating air.

It is desired of course that the flow of the upwardly passing wet air and the downwardly passing activating air be transferred from one compartment to the other periodically and at regular intervals so long as the humidostat which is used with the system calls for dry air. For the purpose of rocking the shaft, I employ a small geared-head motor 33 located in the base of the housing 10 (see particularly Figs. 1, 3, and 8) which motor is connected by speed reducing gearing contained in a speed reduction housing 34 to a vertical shaft 35 having a crank 36 which is connected by a link 37 to a crank 38 on the damper supporting and operating shaft 32. The connection between the link 37 and the crank 38 is yielding due to the provision of springs 39 between abutments on the link and a sliding block 40 to which the end of the crank 38 is connected. By this yielding connection a firm and airtight fit is obtained between the faces of the dampers and the walls of the chambers 14 to 17 adjoining or surrounding the inlet and outlet ports which the dampers control. It is perhaps unnecessary to state that the compartments 12 and 13 are airtight except for the ports which are open at any given time.

As long as the humidostat calls for dry air, the damper operating motor is started and then stopped at predetermined intervals. Each time the motor is started it runs long enough to give the crank 36 a one-half revolution or to move it from one dead-center position with respect to the link 37 to the other.

An important feature of the present invention is the novel timing mechanism which is associated with the damper turning mechanism by which the cycles of activation heating period and the adsorption period are automatically controlled. This timing and control mechanism not only causes the periodic shifting of the dampers (assuming that the humidostat calls for dry air) but each cycle includes a full length period of adsorption but less than that period for activation inasmuch as it is desired that the activation cycle include a so-called purge period (about one-fourth of the time of the cycle) during which air is drawn through the activation circuit without being heated so as to cool the previously heated adsorbent material to a temperature at which it is again useful for adsorption purposes during the next cycle.

Figure 9:
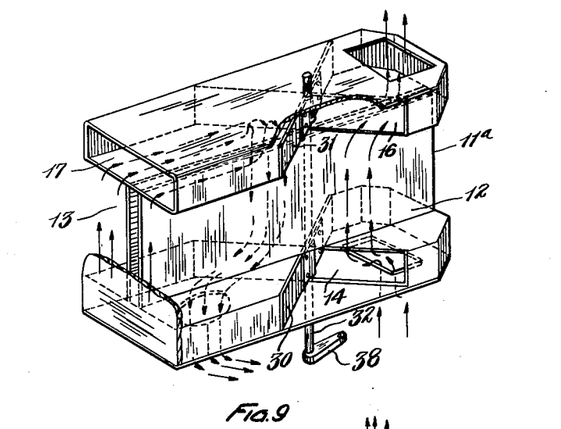
Figs. 9 and 10 are schematic perspective views of the apparatus with the outer casing and the dehumidifying trays removed to show more clearly the two operating positions of the dampers and the corresponding flow of air.
Figure 10:
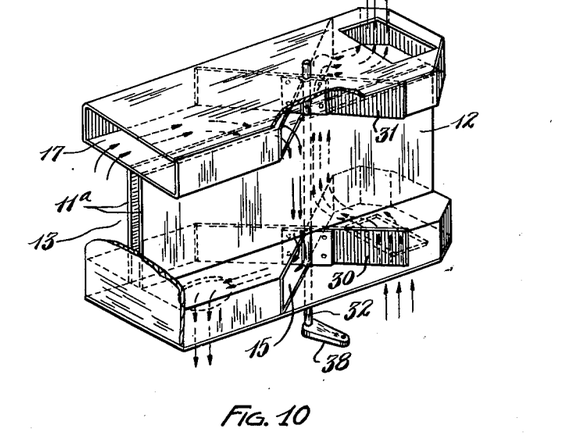

In Fig. 9 I have illustrated the position of the dampers 30 and 31 during the period when moist air is passing upwardly through the compartment 12 for the purpose of having its moisture removed, while activating air is passing downwardly through compartment 13 to activate the adsorbent material in the trays of that compartment. The air passing through compartment 12 is indicated by double arrows, while that passing through compartment 13 is indicated by triple arrows. In this connection it will be understood, of course, that the flow of air is more or less uniform throughout each of these compartments. Fig. 10 shows the other operative position of the dampers 30 and 31 and indicates by the same arrow markings that the flow is upward through compartment 13 for dehumidifying the air flowing to the space to be conditioned while reactivating air is flowing downwardly through compartment 12 to reactivate the adsorbent material in that compartment.

Figure 8:
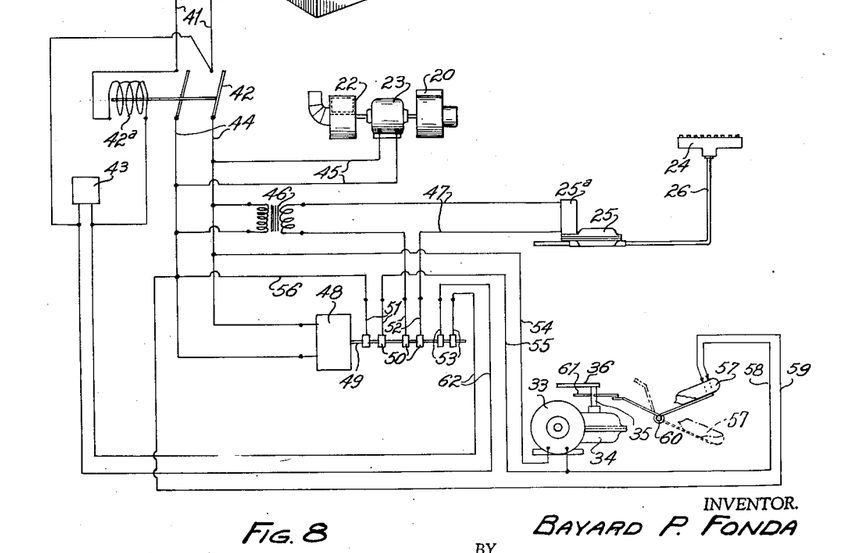
Fig. 8 is a diagrammatic view showing particularly the electrical connections and equipment used in the automatic control of the dehumidifier and the reversal of the position of the dampers at predetermined intervals.

This control and operating mechanism will now be described, reference being had to Fig. 8. Current is supplied for operating the fan motor 23 and the damper operating motor 33, and for other purposes to be referred to, from two main current supplying conductors 41. These conductors are connected to two terminals of a magnetic switch 42 having a solenoid 42a, and conductors 41 are connected to the solenoid 42a through a humidostat 43 which is normally located in the space to which dehumidified air is to be supplied. So long as the humidostat calls for dry air, the switch 42 is closed, thereby energizing two conductors 44 which supply current to all parts of the control system including the fan motor 23 which is connected to the conductors 44 by conductors 45. Likewise, the conductors 44 supply current to the solenoid 25a of the gas valve 25 through a transformer 46, conductors 47, and certain contacts to be referred to. Additionally, the conductors 44 are connected to the damper operating motor 33 in a manner hereinafter described and to an electric timer 48 consisting of an electric clock which is geared to a shaft 49 arranged to revolve once in any predetermined period of time, which, by way of example, may be assumed to be ten minutes. This clock is energized and continues to run as long as the switch 42 remains closed. The shaft 49 carries a series of cams 50, in this instance six cams, which operate pairs of contacts designated 51, 52, and 53.

One terminal of the motor 33 is connected by conductor 54 to one of the conductors 44 while the other terminal is connected by conductors 55 and 56 and the contacts 51 to the other conductor 44. As will be explained presently, this second terminal of the motor is during a certain period connected to the second mentioned conductor 44 independently of the two contacts 51 through the medium of a limit switch here shown as a mercury switch 57 having two contacts, one of these contacts being connected by a conductor 58 to the second mentioned terminal of the motor 33 and the other being connected by a conductor 59 to the second mentioned conductor 44. In other words, the circuit of the motor 33 may be completed through the conductor 54, the conductors 55 and 56, and the contacts 51, or it may be completed through conductor 54, mercury switch 57, and through conductors 58 and 59. The contacts 51 and the mercury switch are therefore designed to separately complete two parallel circuits through the motor 33.

The mercury switch 57 is pivoted at 60 adjacent the damper operating motor 33. It is designed to drop by gravity to the dotted line position shown in Fig. 8, in which event the contacts of the switch are connected by the body of mercury, thus completing the circuit through the motor 33 independently of the contacts 51 and is designed to be elevated, as indicated by full lines in Fig. 8, so as to open the circuit at the switch. The switch is adapted to be tilted to this elevated position by two oppositely disposed rods or fingers 61 which are carried by the vertical shaft 35 which is operated by the reduction gearing of the motor 33 and carries the crank 36 which shifts the dampers 30 and 31 from one operative position to the other, the rods 61 simply acting as cams to elevate and then release the mercury switch (see Figs. 3 and 8).

The contacts 52 constituting the second pair of contacts of the series are in the circuit of the secondary of the transformer 46 and the solenoid 25a of the gas valve 25. Two of the cams on shaft 49 are adapted to close the circuit through the solenoid 25a at the contacts 52, thereby causing the valve 25 to be opened and gas to pass to the burner 24 and to be ignited by the flame of the pilot burner. Later in the cycle, the cams open the circuit at the contacts 52 so as to cause the closure of the valve 25, thereby shutting off the flow of gas to the burner 24 for the start of the purge period.

The contacts 53 which constitute the third set of the series are designed to be closed or connected by the third set of cams on the shaft 49 so as to short-circuit the humidostat during each cycle so as to prevent the opening of the magnetic switch 42 should the contacts of the humidostat open at undesirable times in the cycle of operations, as, for example, when the motor 33 is in the act of shifting the dampers from one operative position to the other.

At the start of the cycle, which occurs when the humidostat makes contact calling for dry air, the magnetic switch 42 is closed, whereupon the fan motor 23 and the electric timer 48 are energized and start rotating the fans 20 and 22 and the timer shaft 49 respectively. At this time none of the contacts 51, 52, and 53 are closed, but immediately after the timer starts, the cams connect the two contacts 52 and the two contacts 53. The connecting of the contacts 52 causes the opening of the gas valve 25, as above stated, and the supply of gas to the burner which, as previously mentioned, is located directly in the inlet chamber 17 for the activating air which is thus heated and conditioned for activating the adsorbent material in the trays of one of the compartments. The closing of the contacts 53 short-circuits the humidostat, thus holding the magnetic switch 42 closed until the end of the cycle.

Before the next operation in the sequence, the electric motor of the timer continues to run for a predetermined period which is preferably approximately seven minutes in a system having ten minute cycles. During this period, air is being continuously dehumidified in one compartment and the adsorption material in the other compartment is being activated, but at the end of this period the two contacts 52 are disconnected, deenergizing the solenoid 25a and causing the gas to be shut off and the flame at the burner 24 to be extinguished. This is the start of the purge period during which time air is drawn through the activation circuit without being heated. This cools the heated adsorbent material to a temperature at which it is again useful for adsorption purposes.

The purge period continues to near the end of the cycle, and just a few seconds before the completion of the cycle, the two contacts 51 are momentarily closed. The closing of these contacts furnishes power to the damper operating motor 33 which immediately begins to turn, starting the dampers over to their other position and at the same time releasing the mercury limit switch and allowing it to drop to the position at which the mercury of the switch closes the two switch contacts, thus short-circuiting the contacts 51. The circuit at the contacts 51 is then broken by the cams on the timer shaft 49, but the damper operating motor 33 continues to operate as its circuit is now completed by the mercury switch. When this motor has operated sufficiently to turn the damper operating crank 36 180°, which is necessary to shift the dampers to their new position, the mercury switch is tripped to its normal or open position by the pin 61, whereupon the power circuit is disconnected from the motor and the latter stops in exactly the proper position to hold the dampers in their new position. Shortly after this occurs, the circuit at the two contacts 53 on the electric timer is opened, and unless the humidostat circuit is still made, the magnetic switch 42 opens and the machine stops running. On the other hand, if the humidostat still calls for dry air, the machine starts its succeeding cycle and continues operating.

It will be seen that the contacts 53 insure that the machine will run to the end of the cycle then occurring even though the humidostat circuit is open. Likewise, it will be seen that the contacts 51 only serve to start the damper operating motor at the given point in the cycle of operations and that the addition of the limit switch 57, which is an important feature of the control system, takes from the electric timer the control of the period of operation of the damper operating motor and insures the stopping of the motor only after the dampers have been moved from one of their operating positions to the other or properly positioned for the initiation of the succeeding cycle. Thus the disadvantage of unsynchronized action between the timer 48 and the motor 33 is eliminated.

Thus it will be seen that the control system above described is reliable in operation and contributes greatly to the efficiency of the machine and also that the machine possesses the other features of simplicity and compactness with ample capacity, and therefore that the various objects recited at the beginning of the specification are attained to a high degree.

While I have shown the preferred construction, I do not desire to be confined to the precise details or arrangements shown but aim in my claims to cover all modifications which do not involve a departure from the spirit and scope of the invention.

Having thus described my invention, I claim:

1. In a dehumidifier, a casing, two compartments arranged side by side in said casing spaced from the top and bottom of the casing, two fans mounted in said casing below said compartments, means for driving said fans, said casing above the compartments having an outlet for dehumidified air and an intake for reactivating air, means for connecting the exhaust from one fan to discharge into either one of said compartments and for connecting the intake to the other fan to withdraw air from the remaining compartment, two four-way valves in the casing one above and one below said compartments for interchanging said fan connections at the bottom and said intake and outlet connections at the top, and means connecting said valves together for simultaneous operation.

2. In a dehumidifier, a casing, two compartments arranged side by side in said casing spaced from the top and bottom of the casing, means for circulating air to be dehumidified and reactivation air through said compartments alternately, two vertical dampers mounted one above and one below said compartment to turn upon vertical axes positioned between said compartments, said dampers dividing each of the spaces below and above the compartments into two chambers with division planes that are shiftable from one diagonal position to an opposite diagonal position, a pair of ports connecting each of said spaces with each of said compartments, said ports being arranged in transverse alignment with said dampers, and means for introducing air to be dehumidified into one lower chamber and delivering it from one upper chamber and for introducing reactivation air into one upper chamber and delivering it from one lower chamber.

3. In combination, a dehumidifier for supplying air to a space to be conditioned, means for circulating activating air and air to be dehumidified, valve means for controlling said circulation, motive means for actuating the air circulating means, motive means for actuating the valve means, an electric timer, a source of current supply, a switch for controlling the energization of the first motive means and the timer, a humidostat for controlling said switch, said humidostat being located in the space to be conditioned said timer having means for starting said second motive means, and a short circuit for said humidostat arranged to be opened by said timer at intervals only, whereby said motive means may not be interrupted after the initiation of a valve movement until that movement is completed.

4. In combination, a dehumidifier for supplying air to a space to be conditioned, dehumidifying and reactivating means operating in cycles, an electric timer for determining the length of said cycles, a source of current supply, a switch for controlling the energization of the timer, a humidostat for controlling said switch, said humidostat being located in the space to be conditioned and means actuated by the timer for disabling said humidostat control except at the end of a cycle.

5. In combination, a dehumidifier for supplying air to a space to be conditioned, dehumidifying and reactivating means operating in cycles, an electric timer for determining the length of said cycles, a source of current supply, a switch for controlling the energization of the timer, a humidostat for controlling said switch, said humidostat being located in the space to be conditioned and a short circuit for the humidostat controlled by said timer, whereby the humidostat may stop the timer at the end of a cycle only.

6. In combination, a dehumidifier for supplying air to a space to be conditioned, means for circulating activating air and air to be dehumidified, valve means for controlling said circulation, motive means for actuating said valve means, an electric timer, means actuated by said timer for controlling said motive means, a source of current supply, a switch for controlling the energization of the time, a humidostat for controlling said switch, said humidostat being located in the space to be conditioned and means actuated by the timer for disabling said humidostat control except at predetermined points in the cycle.

7. In a dehumidifier, a casing, a compartment for adsorbent material in the casing, air circulating means comprising a fan mounted in the casing below said compartment and electric motive means for said air circulating means also located in the casing beneath said compartment, an air passage at the top of the casing for directing reactivating air into said compartment, an intake for reactivating air at the bottom of the casing in position to direct air over said electric motive means, and an air heater in the path of the air passing from the bottom of the casing to said air passage at the top of the casing.

8. In a dehumidifier, a housing, a partition therein constituting the dividing wall between two compartments, adsorbent material in each of said compartments, a pair of chambers beyond said compartments at one end of the latter and a pair of chambers beyond said compartments at the other end thereof, each of said chambers extending transversely of said partition, a central shaft extending from one pair of chambers to the other, a damper valve on the shaft beyond one end of said compartments and another damper valve on the shaft beyond the other end of said compartments, each of said chambers having two ports each connecting with one of said compartments, each of said valves being adapted to close one port of each of two chambers when in one position and the other port of each of the said chambers when in another position, and means for turning the shaft to shift the valves from one of said positions to the other, whereby two different fluids may be caused to flow through the two compartments simultaneously and whereby each fluid may be shifted alternately from one compartment to the other.

9. In a dehumidifier, a housing, a partition therein constituting the dividing wall between two compartments, adsorbent material in each of said compartments, a pair of chambers beyond said compartments at one end of the latter and a pair of chambers beyond said compartments at the other end thereof, each of said chambers extending transversely of said partition, a central shaft extending from one pair of chambers to the other, a damper valve on the shaft beyond one end of said compartments and another damper valve on the shaft beyond the other end of said compartments, each of said chambers having two ports each connecting with one of said compartments, each of said valves being adapted to close one port of each of two chambers when in one position and the other port of each of the said chambers when in another position, a pair of fans at one end of the housing for circulating fluid in opposite directions through the two open ports at each end of the housing, and means for turning the shaft to shift the valves from one of said positions to the other thereby closing the last named ports and opening the remaining ports and causing the fluid moved by each of said fans to flow alternately through one or the other of said compartments.

BAYARD P. FONDA.